United States Patent
Shmueli et al.

(10) Patent No.: US 9,607,052 B2
(45) Date of Patent: Mar. 28, 2017

(54) QUERY NETWORKS EVALUATION SYSTEM AND METHOD

(75) Inventors: Oded Shmueli, Nofit (IL); Royi Ronen, Jerusalem (IL)

(73) Assignee: Technion Research & Development Foundation Limited, Haifa (IL)

( * ) Notice: Subject to any disclaimer, the term of this patent is extended or adjusted under 35 U.S.C. 154(b) by 10 days.

(21) Appl. No.: 12/648,546

(22) Filed: Dec. 29, 2009

(65) Prior Publication Data

US 2010/0306271 A1    Dec. 2, 2010

Related U.S. Application Data

(60) Provisional application No. 61/141,057, filed on Dec. 29, 2008.

(51) Int. Cl.
*G06F 17/30* (2006.01)

(52) U.S. Cl.
CPC .............. *G06F 17/30545* (2013.01)

(58) Field of Classification Search
CPC .......................... G06Q 50/01; G06F 17/30513
USPC ............. 707/798, 773; 706/45; 705/319
See application file for complete search history.

(56) References Cited

U.S. PATENT DOCUMENTS

| | | | | |
|---|---|---|---|---|
| 4,823,306 A * | 4/1989 | Barbic | ........... | G06F 17/30011 |
| 6,785,673 B1 * | 8/2004 | Fernandez | ......... | G06F 17/2247 |
| 7,289,947 B2 * | 10/2007 | Ammons | ........... | H04L 41/12 |
| | | | | 703/22 |
| 7,805,440 B2 * | 9/2010 | Farrell | ........... | G06F 17/30958 |
| | | | | 707/728 |
| 7,933,916 B2 * | 4/2011 | Dolin | ........... | G06F 17/30427 |
| | | | | 707/760 |
| 7,958,120 B2 * | 6/2011 | Muntz | ........... | G06Q 10/00 |
| | | | | 707/736 |
| 8,024,328 B2 * | 9/2011 | Dolin | ........... | G06F 17/30867 |
| | | | | 707/706 |
| 2004/0249809 A1 * | 12/2004 | Ramani | ........... | G06F 17/30259 |
| 2005/0038533 A1 * | 2/2005 | Farrell | ........... | G06F 17/30958 |
| | | | | 700/73 |
| 2006/0253476 A1 * | 11/2006 | Roth | ........... | G06F 17/2211 |
| 2006/0271564 A1 * | 11/2006 | Meng Muntz | ......... | G06Q 10/00 |
| 2006/0274062 A1 * | 12/2006 | Zhang | ........... | G06K 9/6224 |
| | | | | 345/420 |
| 2007/0087756 A1 * | 4/2007 | Hoffberg | ........... | G06Q 10/0631 |
| | | | | 455/450 |
| 2007/0185868 A1 * | 8/2007 | Roth | ........... | G06F 17/30911 |
| 2007/0282826 A1 * | 12/2007 | Hoeber | ........... | G06F 17/3064 |
| 2007/0299835 A1 * | 12/2007 | Takeuchi | ........... | G06F 17/30958 |
| 2008/0059576 A1 * | 3/2008 | Liu | ........... | G06Q 10/10 |
| | | | | 709/204 |

(Continued)

OTHER PUBLICATIONS

Drupal, "User Relationships," Published on Aug. 15, 2007, Posted by alex.k, https://www.drupal.org/project/user_relationships, pp. 1-2.*

*Primary Examiner* — Robert Beausoliel, Jr.
*Assistant Examiner* — Alexandria Bromell

(57) ABSTRACT

A query network is disclosed, comprising sets of nodes and edges connecting pairs of nodes. The nodes of the query network are associated with edge-defining queries. A method is taught for fully evaluating such a query network. A language is further disclosed for constructing queries. The query network may be used to model a social network, a professional network or the like.

20 Claims, 13 Drawing Sheets

(56) References Cited

U.S. PATENT DOCUMENTS

| | | | |
|---|---|---|---|
| 2009/0077001 A1* | 3/2009 | Macready | G06N 5/02 706/57 |
| 2009/0157419 A1* | 6/2009 | Bursey | G06Q 10/101 705/346 |
| 2009/0164895 A1* | 6/2009 | Baeza-Yates | G06F 17/30867 715/700 |
| 2009/0222404 A1* | 9/2009 | Dolin | G06F 17/30427 |
| 2009/0271370 A1* | 10/2009 | Jagadish | G06Q 10/10 |
| 2010/0070448 A1* | 3/2010 | Omoigui | H01L 27/1463 706/47 |
| 2010/0125573 A1* | 5/2010 | Venolia | G06F 17/30991 707/722 |
| 2010/0138698 A1* | 6/2010 | Angele | G06N 5/02 714/37 |
| 2010/0223268 A1* | 9/2010 | Papakonstantinou | G06F 17/30864 707/749 |
| 2013/0053005 A1* | 2/2013 | Ramer | H04W 4/025 455/414.1 |
| 2013/0077835 A1* | 3/2013 | Kritt | G06K 9/00677 382/118 |
| 2013/0085866 A1* | 4/2013 | Levitis | G06Q 30/0207 705/14.69 |
| 2013/0111509 A1* | 5/2013 | Guo | G06K 9/00677 725/12 |

\* cited by examiner

Figure 10

Input: (N, $F_0$), a query network.

Output: (N, F), a fully evaluated query network

Method:

1 : stopFlag ← false;

2 : while stopFlag = false

3 :     stopFlag ← true;

4 :     for each n in N

5 :         evaluate q(n) once, let Q be the (binary) result;

6 :         if Q \ F ≠ ∅

7 :             stopFlag ← false;

8 :             F ← F U Q;

9 :         end if

10:     end for each

11: end while

Figure 11

Input: (N, F0), a query network; k, maximal query radius.

Output: (N, F), a fully evaluated query network.

Method:

1:   $R \leftarrow N$

2:   while $R \neq \emptyset$

2:      $P \leftarrow \emptyset$

3:         for each n 2 R

3:            evaluate q(n), let Q be the (binary) result;

6:            if $Q \setminus F \neq \emptyset$

7:               $P \leftarrow P \cup \{m \in B(n, l) \mid l < k\}$

8:               $F \leftarrow F \cup Q$;

9:            end if

10:        end for each

11:     $R \leftarrow P$

12:  end while

Figure 12A

Input: (F0,N), a query network; k, maximal query radius; A, a graph-partitioning algorithm; p, number of partitions.

Output: (F,N), a fully evaluated query network.

Method:

1 :     invoke A to partition N into p parts; let R be the set of parts, $\{(F^0_i, N_i) \mid 1 \leq i \leq p\}$;

2 :     invoke BRT evaluation on each $r \in R$;

3 :     while $\exists (u, v) \in F^0$ such that u and v are in different parts

4 :         P ← matchPairs(R);     //see procedure below

5 :         for each pair $(r_i, r_j) \in P$

6 :             R ← R \ $\{r_i, r_j\}$;

7 :             R ← R ∪ merge & eval (ri, rj );

8 :         end for each

9 :     end while procedure matchPairs(R)   //R is a set of networks

1 :     for each crossing edge (u, v) with regard to the networks in R

2 :         let $r_u$ (respectively, $r_v$) be u's (respectively, v's) network;

3 :         initialize a counter $c_{u,v}$ to 0, if not exists;

4 :         $c_{u,v}$ ← $c_{u,v}$ + 1;

5 :     end for each

6 :     P ← ∅;

7 :     while there is more than one network in R

8 :         add to P a pair $(r_v, r_u)$ such that $c_{u,v} + c_{v,u}$ is maximal;

9 :         delete $r_v$ and $r_u$ from R;

10:     end while

11:     return P;     // end procedure

Figure 14

1  SELECT COUNT(PATH.nodes.*), PATH
2  FROM PATH (Bob TO X AS P1
3  TO Y AS P2)
4  WHERE Y.company = 'HAL' and
5  Y.position = 'manager' and
6  ATMOST 0 IN P2.nodes SATISFY
7  (company='ACME') and
8  COUNT(P1.nodes.*) = 2 and
9  COUNT(PATH.nodes.*) <= 4
10 ORDER BY MULT(P2.edges.weight)

Figure 15

SELECT <field-list>

FROM PATH(<name> <to-var-list>)

WHERE <predicates> //optional

ORDER BY <field-list> //optional

<field-list>:= <field>,...,<field>

<to-var-list>:= <to-var>,...,<to-var>

<to-var>:= TO <var> AS <alias>

<predicates>:= <predicate> |

<predicate> OR <predicate> |

<predicate> AND <predicate> |

NOT <predicate>

<predicate> := <node-predicate> |

<edge-predicate> | <path-predicate>

Figure 16 – Select from Group Syntax

SELECT <field-list>

FROM GROUP(<subgroups>)

WITH PATH(<nov> <to-var-list>),...,

PATH(<nov> <to-var-list>)

WHERE <g-predicates> //optional

ORDER BY <field-list> //optional

<subgroups>:=<subgroup>,...,<subgroup>

<subgroup>:= <g>,...,<g> AS <alias>

<g>:= <var-name-list> |

DISTINCT(<var-name-list>) <var-name-list>:= <nov>,...,<nov>

<nov>:= <name> | <var>

<g-predicates> := Boolean combinations with <g-predicate>

<g-predicate> :=<node-predicate> |

<group-predicate> | <path-predicate>

Figure 17A

```
1    SELECT SUM(GROUP.nodes.experience),GROUP
2    FROM GROUP(Bob AS G1,
3    DISTINCT(X,Y,Z) AS G2)
4     WITH PATH(Bob TO X AS P1),
5    PATH(Bob TO Y AS P2),
6    PATH(Bob TO Z AS P3)
7     WHERE COUNT(P1.edges.*)<=3 and
8    COUNT(P2.edges.*)<=3 and
9    COUNT(P3.edges.*)<=3 and
10    ALL IN G2.nodes SATISFY
11    (experience>=5) and
12    ALL SUBGROUPS(U,V) IN G2 SATISFY
13    (PATH(U TO V AS P4)
14    COUNT(P4.edges.*)<=2))
15    ORDER BY GROUP
```

Figure 17B (22,(Bob, Eve, Frank, Gloria))

(21,(Bob, Dave, Frank, Gloria))

(20,(Bob, Dave, Eve, Gloria))

(21,(Bob, Dave, Eve, Frank))

Figure 18 – a group predicate structure

*<group-predicate>:=*

*<agg-group-predicate> |*

*<group-operator>*

*IN <group-alias>.nodes*

*SATISFY(<node-predicates>) |*

*<group-operator> SUBGROUPS(<var-list>)*

*IN <group-alias>*

*SATISFY(<p-a-predicates>)*

*<p-a-predicates>:= Boolean combinations*

*with <p-a-predicate>*

*<p-a-predicate>:= <p-alias> <path-predicate> <p-alias>:= PATH(<nov>*

*<to-var-list>)*

QUERY NETWORKS EVALUATION SYSTEM AND METHOD

CROSS REFERENCE TO RELATED APPLICATION

This application claims priority to U.S. Provisional Patent Application No. 61/141,057 filed Dec. 29, 2008, incorporated herein by reference in its entirety.

FIELD OF THE INVENTION

The present invention relates to querying databases. In particular the invention relates to networks, such as social networks, having potentially very large query sets whose size is of the same order as the size of the database on which they run.

BACKGROUND

A social network is a social structure made of units such as individuals or organizations, known as 'nodes' which are connected via links representing friendship or the like, known as 'edges'. Social networks may be supported by internet based social network services such as Facebook, Twitter, LinkedIn and the like.

The increasing popularity of computer based social network services introduces the need to manage and query increasing amounts of data. Databases are used for data management of social network services and users may take advantage of simple query languages such as SQL (Structured Query Language) to process their own data as well as that of their immediate contacts.

Traditional databases rely on the assumption that the size of a query is small and the data being queried is large. This approach sits well with the state of current social network services, in which the main social networking features of establishing and managing connections, or edges, between participants, or nodes, is performed manually.

However, as the number of queries increases in size dramatically and connections management is constantly increasing in complexity, current query languages such as SQL lack concepts which are required for expression and querying of connection data.

The need remains, therefore, for effective database evaluation methods for large query sets, whose size is of the same order as (or even larger than) the size of the database on which they run, and a query language including terminology to express connection-based queries. Embodiments described hereinbelow address this need.

SUMMARY OF THE EMBODIMENTS

Embodiments described herein disclose a database apparatus for storing a query-network comprising a set of nodes and a set of edges, where the edges connect pairs of nodes and wherein at least a subset of the nodes are each associated with at least one edge-defining query.

Optionally, edge-defining queries define a set of generated-edges to be added to the existing set of edges. Optionally, set of generated-edges connect the node associated with its respective query with another node selected from the set of nodes.

Optionally, the database apparatus includes a subset of nodes associated with at least one edge-accepting query. Optionally, the edge-accepting query defines a subset of generated-edges to be added to existing set of edges.

The edge-defining query of the database apparatus may comprise a datalog rule.

The database apparatus may comprise a plurality of storage units connected to a network.

The database apparatus of may contain data pertaining to at least one of a group consisting of: a social network, a professional network, an academic network, or an item network.

Other embodiments teach a method for fully evaluating a query network stored on a database apparatus, such that all edges defined by edge-defining queries become members of the set of edges.

The method for fully evaluating a query network may comprise the steps of selecting a node from said subset of said nodes, evaluating the selected node according to the edge-defining query associated with said selected node, selecting another node from said subset of said nodes and repeating the evaluation if all members of the subset of nodes have been evaluated since a generated-edge was added to the set of edges then terminating the method.

The method step of evaluating the selected node according to the edge-defining query associated with said selected node, may comprises the substeps of adding to the set of edges the members of a set of generated-edges defined by the edge-defining query associated with said selected node repeatedly as long as the set of generated-edges is not an empty set, or if the set of generated-edges is an empty set, then selecting another node from the subset of nodes and repeating the evaluation.

The method step of adding to the set of edges the members of a set of generated-edges defined by the edge-defining query associated with a selected node may further comprise validating that the edges are accepted by edge-accepting queries associated with target nodes.

The method step of selecting another node from a subset of nodes and repeating the evaluation step may comprise the substeps of generating a subset of nodes which are connected to the previously selected node via a path containing less edges than the maximal radius of the query network and selecting a member of that subset.

Other embodiments teach a method for fully evaluating a query network, comprising the steps of partitioning the query network into a plurality of query sub-networks, fully evaluating each said query sub-network and merging the query sub-networks.

More embodiments teach a method for selecting a group from a query network stored on a database apparatus, where the group comprises a set of nodes which are evaluated according to an edge-defining query associated with a selected node. Other embodiments teach a method for selecting a path from a query network stored on a database apparatus where the path comprises a set of edges which are used in an evaluation of an edge-defining query associated with a selected node. In addition, other embodiments teach a method for creating connections between nodes on a network stored on a database apparatus wherein the connections are formed between nodes that comprise a selected path or a selected group evaluated according to an edge-defining query associated with a selected node.

BRIEF DESCRIPTION OF THE FIGURES

For a better understanding of the invention and to show how it may be carried into effect, reference will now be made, purely by way of example, to the accompanying drawings.

With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawing making apparent to those skilled in the art how the several forms of the invention may be embodied in practice.

Figure 1:
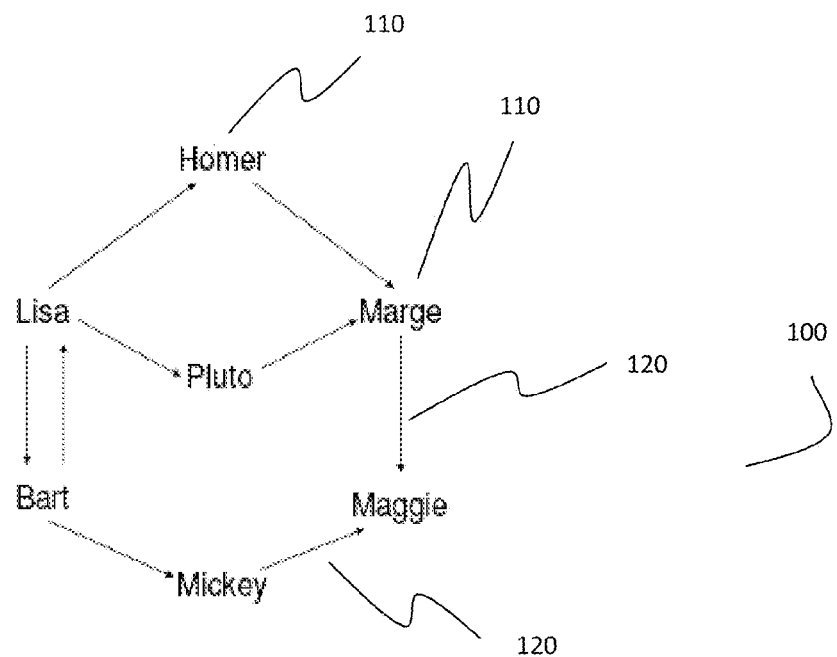
Figure 2:
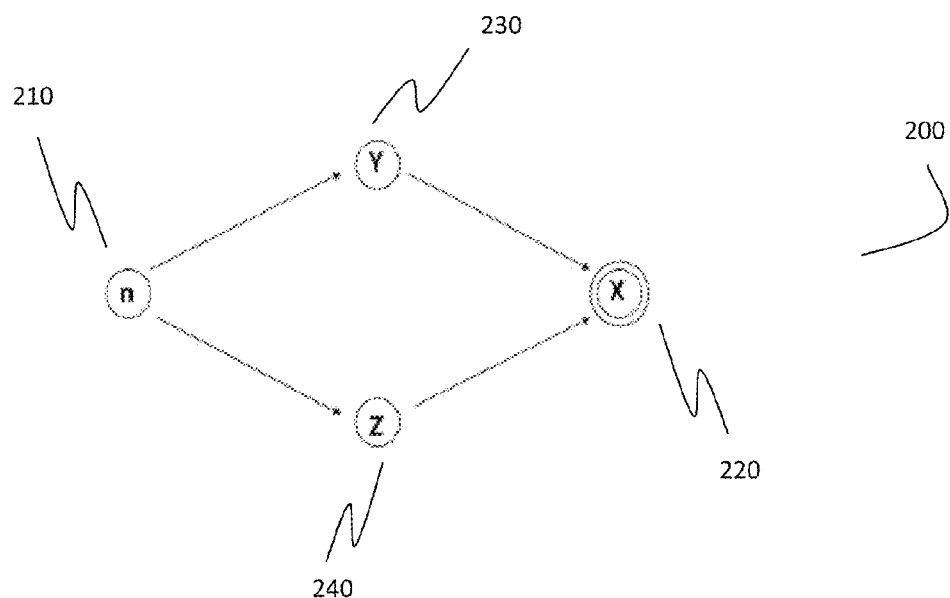
Figure 3:
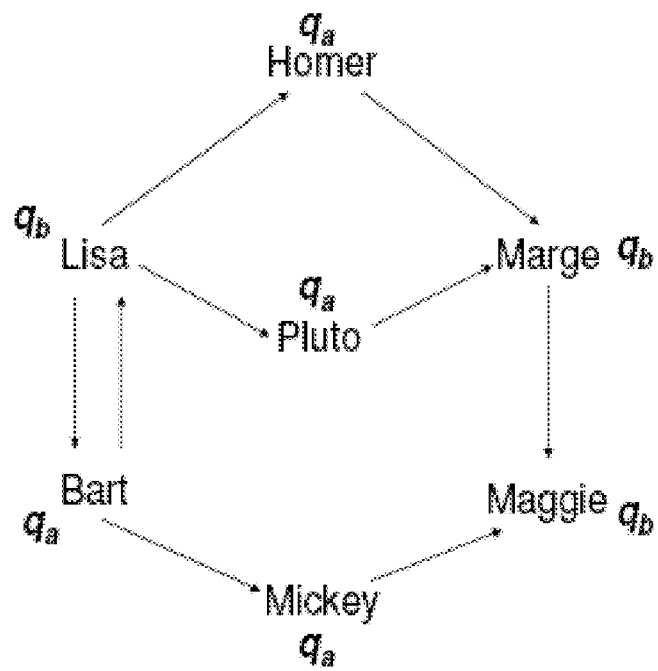
Figure 4:
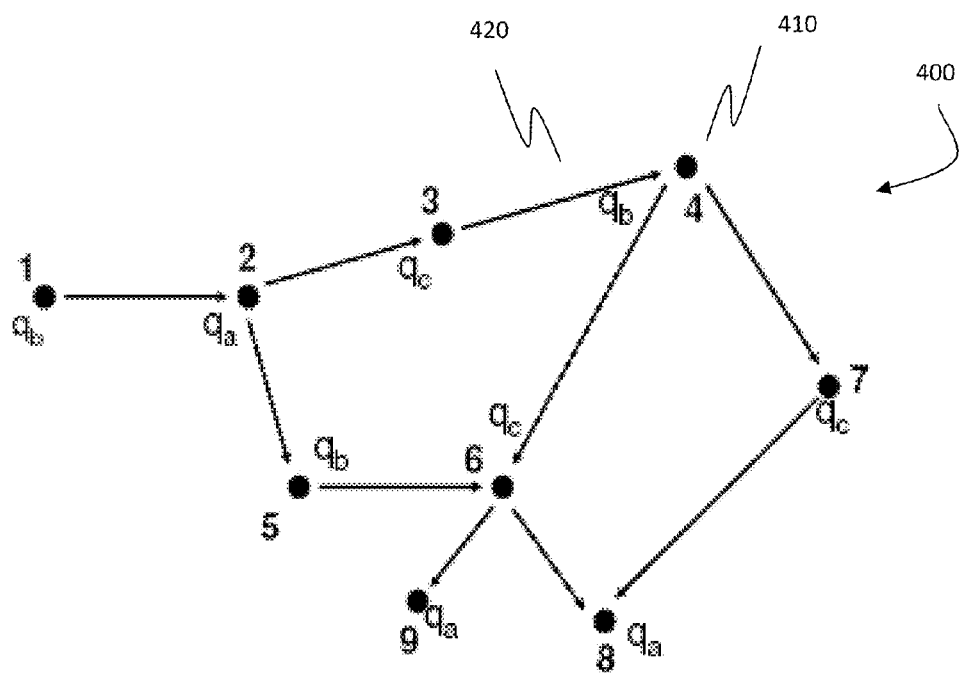
Figure 5:
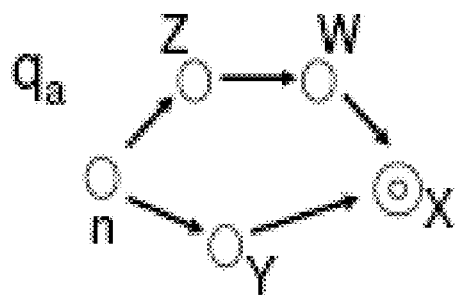
Figure 6:
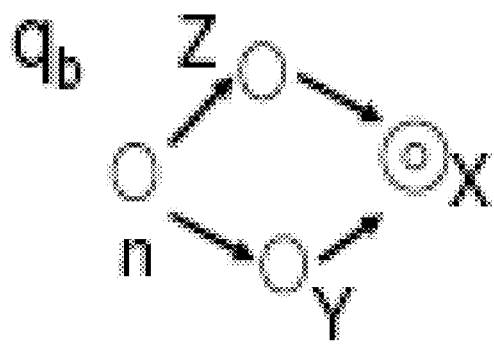
Figure 7:
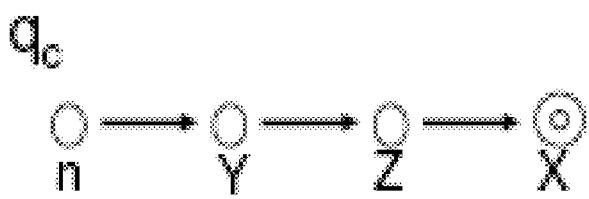
Figure 8:
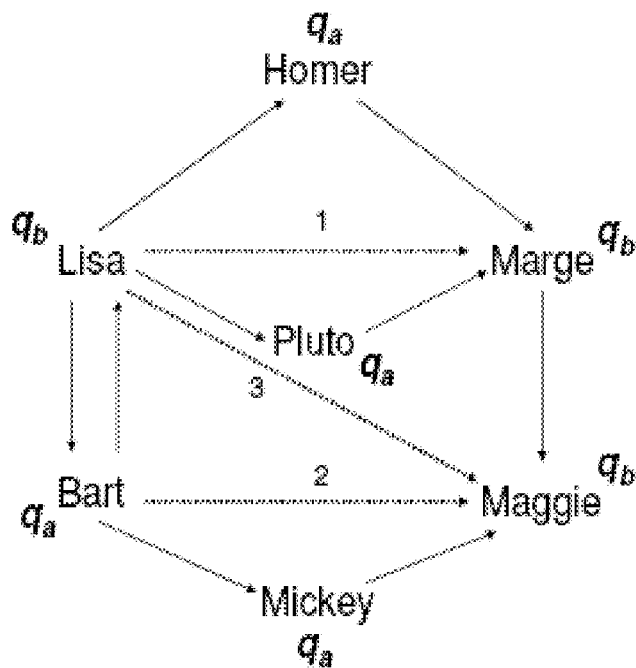
Figure 9:
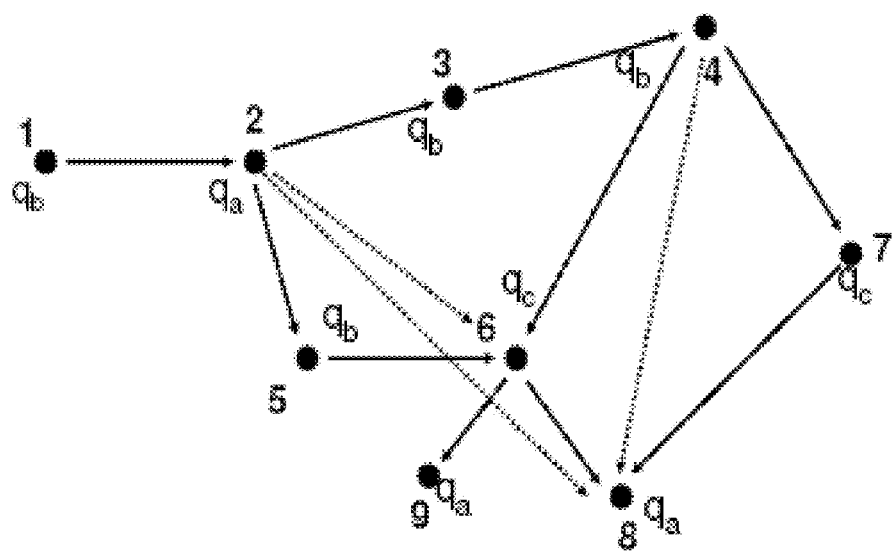
Figure 12B:
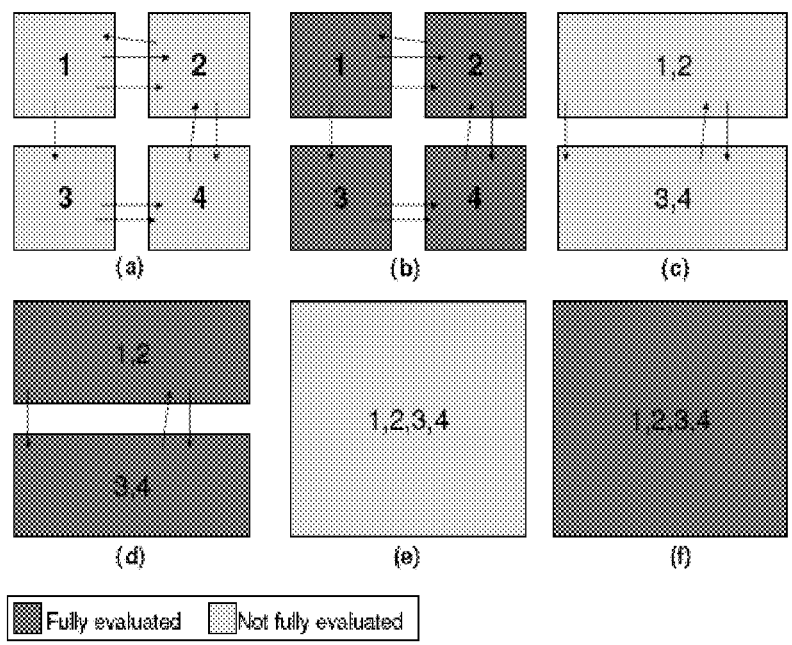
Figure 13:
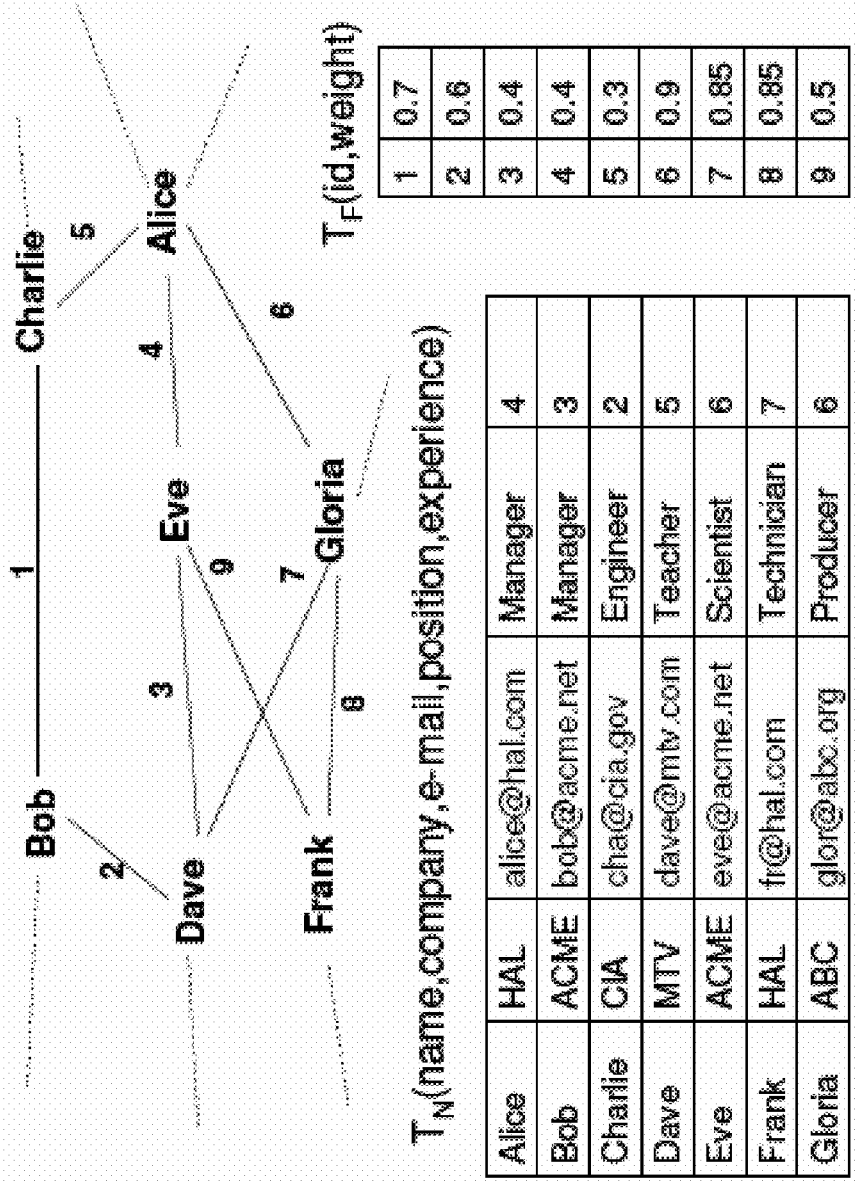

In the accompanying drawings,

FIG. 1 is a graphic representation of an embodiment of a sample social network;

FIG. 2 is a graphic representation of an embodiment of a Conjunctive Query or a policy defining which connections a participant in a social network would like to add himself;

FIG. 3 is a graphic representation of an embodiment of a sample social network with edge-defining queries;

FIG. 4 is a graph-based representation used to formalize a model of a social network which will be referred to as a 'query network';

FIGS. 5, 6, and 7 are graphic illustrations of embodiments of individual social network participant rules $q_a$, $q_b$ and $q_c$ (respectively);

FIG. 8 is a graphic representation of the fully-evaluated sample social network of FIG. 3;

FIG. 9 is a graphic representation of an embodiment of a fully-evaluated query network;

FIG. 10 is a formal representation of an iterative method for evaluating a query network;

FIG. 11 is a formal representation of a Backward-Radius Triggering method for evaluating a query network;

FIG. 12A is a formal representation of a "Divide and Conquer" method for evaluating a query network;

FIG. 12B is a sample graphic representation of how the "Divide and Conquer" method for evaluating a query network operates;

FIG. 13 is a sample representation of an embodiment of a social network composed of a graph and two tables;

FIG. 14 is a sample "SELECT FROM PATH" query which refers to the embodiment of the social network illustrated in FIG. 13;

FIG. 15 illustrates the "SELECT FROM PATH" syntax as can be used in a Social Query Language;

FIG. 16 illustrates the "SELECT FROM GROUP" syntax as can be used in a Social Query Language;

FIG. 17A is a sample "SELECT FROM GROUP" query which refers to the embodiment of the social network illustrated in FIG. 13;

FIG. 17B is the result of the sample "SELECT FROM GROUP" query of FIG. 17A; and

FIG. 18 illustrates the "group predicate" syntax as used by an embodiment of a Social Query Language.

DETAILED DESCRIPTION OF THE SELECTED EMBODIMENTS

Social networks introduce new challenges to the world of database management and information retrieval. Typically, a participant in a social network is associated with some information (such as name, photograph, interests), and with a list of connections to other participants.

It is a particular feature of embodiments described herein that a participant in the network, represented by a node, may contribute to the social network not only data about himself, but also rules which automatically query, utilize and create network data. For example, participants in a social network may define rules that automatically manage contact lists, send various announcements, filter messages or the like. A participant may want to perform an automated addition of connections, represented by network edges. Such automated addition of edges may be defined using a query associated to the node. A participant may want to query information about connection paths to a target participant, where the path and target participant meet certain criteria.

It will be appreciated that existing query languages lack concepts for correct and effective examination of possible connection paths, and that traditional database evaluation methods such as referenced in the background will not meet the needs of social networks where each participant defines his own rules for connection management. The union of such rules may produce a huge query set, whose size is of the same order or even larger than the size of the set of participants in the network. This significantly diverges from the traditional assumption that queries are small and data is large.

For the sake of clarity, a graph-based formalism will be used hereinbelow to model social networks, and to introduce concepts for expressing social networks queries. The terminology defined with these concepts will be referred to as Social Query Language (SoQL). FIG. 1 is a graphic representation of an embodiment of a social network 100. Nodes 110 in the graphs model the network participants, and edges 120 between nodes represent links between participants. Directed edges are used, which are capable of modeling both networks with reciprocal relations (a situation where if 'a' lists 'b', then 'b' also lists 'a') and networks with non-reciprocal relations.

Participants of a network can specify policies which define which connections they would like to add to themselves. In graphical representations of a policy, the variable in the head of a policy typically appears in a double circle. FIG. 2 illustrates a graphic representation 200 of an embodiment of such a policy, representing a sample policy which connects a first node 'n' 210 with a second node 'X' 220 if there are two distinct participants 'Y' 230 and 'Z' 240 who are connected to both 'n' 210 and 'X' 220.

A path and a group are two structures with which useful queries and updates over social networks can be expressed. A group in a social network is a set of participants, represented graphically by nodes. A path is an ordered set of network participants in which every consecutive two are connected, or in graphic terms, a set of ordered edges connecting one node to another. Reference is now made to FIG. 3, representing a sample social network. In this sample, the participants of the network specify policies which define which connections they would like to add to themselves. Lisa would like to connect to every participant who is a friend of two distinct friends of hers. Bart, on the other hand, would like to connect to every participant who is connected to him through two distinct paths, such that one path is of length 2 edges and the other—of length 3. These two definitions of policies are illustrated graphically as queries $q_a$ (Lisa) in FIG. 5 and $q_b$ (Bart) in FIG. 6. The rest of the participants (nodes) are associated with queries as shown in FIG. 3.

Lisa is not connected to Marge. However, Lisa is connected to Horner and Pluto, who are both connected to Marge. According to Lisa's query, the edge #1 (Lisa, Marge) is added to the network as illustrated in FIG. 8. Based on this added edge, Maggie became a participant to whom Bart is connected through two paths (a two-edge path through Mickey, and a three-edge path through Lisa and Marge). Edge #2 (Bart, Maggie) is therefore added to the network. Note that the addition of edge 2 is based on edge 1 and on original network edges. The addition of edge 2 renders Maggie, who is not connected to Lisa, as a participant who is connected to two distinct friends of Lisa. The edge #3 (Lisa, Maggie), is therefore added. Note that edge 3 is added based on the original edges and edge 2.

It is noted that the addition of edges in this example demonstrates the recursive nature of adding edges to the network. Lisa's query was evaluated and edge 1 was added. Based on this addition (but not based on it only), another evaluation of Lisa's query resulted in the addition of edge 3.

The union of individual participant rules $q_a$, $q_b$ and $q_c$ as shown in FIGS. 5, 6 and 7 respectively, typically constitutes a very large, recursive, Datalog program whose size is of the order of magnitude of the size of the data being queried (data whose size in a social network can easily exceed 1 TB). Traditional optimizers will be hard pressed to handle such queries, even if queries are 'translated' to SQL and their union is transformed to a very large SQL query.

Reference is now made to FIG. 4, showing an embodiment of a graph-based representation 400 used to formalize a model of a social network which will be referred to as a 'query network'. In this embodiment, every node 410, for example and without limitation node 4, has a query 420 for example and without limitation $q_b$ associated with it. A query on node 'n' defines the nodes that the participant corresponding to 'n' would like to add to his connections list. In most social interactions, the query will make use of existing connections in order to create new ones.

Reference is now made back to FIG. 2, showing a graphical representation of an embodiment of a single policy, also referred to as a Conjunctive Query (CQ) 200. As stated previously, CQs are used to formalize relations of a particular node with other nodes. A CQ has a head and a body, both of which are built of atoms. Each atom is a predicate with parameters. A parameter can be either a variable or a constant. The predicates are relation names. A CQ adds to the relation corresponding to its head atom tuples that correspond to a satisfying substitution of the CQ variables.

A Datalog query is a generalization of a CQ. A Datalog query (also called a program) is a set of rules, each of which is essentially a CQ. The result of one rule can be used by another rule in order to produce a new result and so on. A Datalog program can be recursive, which means that a predicate can be defined in terms of itself, either within the same rule or indirectly. The initial relations constitute the Extensional Database (EDB) and the derived relations form the Intentional Database (IDB).

Formal definitions are presented hereinbelow:

A Query Network—a directed graph (N, $F^0$) where N (for Nodes) is a set of users. $F^0$ (for Friends) is a set of directed edges between pairs of distinct elements of N.

$F^0 \subseteq (N \times N) \setminus ((n0,n0)$ such that $n0 \in N)$

Every node n∈N has a query associated with it. The query defines edges of the form (n, •), which are edges such that n would like to add to the initial set of edges, $F^0$, as defined next.

A Query—A query associated with a network node n, q(n), is a Datalog rule of the following form. The rule's head is $F^+(n,X)$, where X is a variable. $F^+$ is an IDB relation which will contain the additions to $F^0$ which is an EDB relation. We define another relation, F, as $F = F^+ \cup F^0$. The body of the rule is composed of predicates corresponding to the relation F and the inequality predicate. We require that one of the predicates is of the form F(n, Y), and that X, the variable in the rule head must appear in one of the F body predicates. The latter requirement is typically added for safety. Further requirements follow the example.

Example. The following query adds to F tuples of the form (n,X) where X is a friend of two distinct friends of n: $F^+(n,X) \leftarrow F(n,Y), F(Y,X), F(n,Z), F(Z,X), Y \neq Z, X \neq n, Y \neq n, Z \neq n$. It is assumed that unless otherwise specified, each two distinct variables imply an inequality predicate between them. It is further assumed that none of the variables is equal to n. Therefore, the query is abbreviated to:

$F^+(n,X)$ $F(n,Y), F(Y,X), F(n,Z), F(Z,X)$.

For a query q(n) we also require that n is the only constant in the query (that is, all other arguments are variables).

Query Graph. Let the Query Graph of a query q(n) be the graph whose nodes are the variables and n, the single constant in the query q(n), and in which a directed edge exists between two variables X and Y (respectively, a constant n and an argument Z) if a predicate F(X, Y) (respectively, F(n,Z)) occurs in the query body. In the graphical representation of the graph, the variable in the head of the rule appears in a double circle.

The query graph corresponding to the query in the previous example is shown in FIG. 2.

Radius—the radius of a query q is the number of edges in the longest path, that never traverses a node more than once, in the query graph corresponding to q. The radius of any query is very small relative to the size of the network.

Backward Radius (bradius)—the bradius of a node n is the maximal distance from another node m such that the query q(m) can 'sense' the edges whose source is n. A formal definition follows herein $\exists B(n,k) = \{m \in N \bullet \|$ there exists a path of length k from me to n$\}$ and $L(n,k) = \{b \bullet \| b \in B(n,k)$ and the radius of a(b) is at least k$\}$.

The bradius of node n is the maximal k such that $L(n, k) \neq \emptyset$. Note that the bradius of any node is bounded by the maximal radius in the network.

FIG. 4 shows a representation of an embodiment of a small query network. Each node has an id (a number) and is associated with one query, either $q_a$, $q_b$ or $q_c$ whose query graphs also appear in FIGS. 5, 6 and 7 respectively. It is assumed that the head of the query is always F(n,X). The radius of node 2 is 3. The radius of node 4 is 2. The bradius of node 8 is 3. The bradius of node 2 is 1.

Single Evaluation of a Node—the process of evaluating a node's query on a given network and subsequently adding a (possibly empty) set of nodes to F.

Example: In the representation of the network illustrated in FIG. 4, a single evaluation of the query associated with node 4, $q_b$, inserts the edge (4, 8) to F.

Exhaustive Evaluation of a Node—The process of evaluating a single query, and this query only, repeatedly and until no edges can be added to F.

Example: node 2 in the network after the edge (4, 8) has been added to the original network. After a single evaluation of this node, (2, 6) is in F. Since (2, 6) is in F, another single evaluation of node 2 will result in the addition of (2, 8) to F. This is different than a single evaluation which adds two edges to F, since the addition of (2, 8) is done based on the edge (2, 6) that is added in the first evaluation.

The network after evaluation is presented in FIG. 9. The new edges are dashed.

A Fully Evaluated Network—a network such that a round of evaluation applied to it will not add any edge to F. FIG. 9 shows an embodiment of a fully evaluated network.

A social network can be represented as a Query Network—a graph-based model in which every node models a network participant and is associated with a datalog rule determining how new connections to other participants will be added.

It is a feature of some embodiments of the social networks that connections between two participants are formed only if both participants approve the connection. Although the participant who initiated a connection generally approves the formation of the connection, before the connection is formed, a further condition may be required that the target participant also approves the connection.

Thus, a distinction may be made between connection-initiation queries and connection-acceptance queries. Formally, datalog rules representing a connection-initiation query will be referred to as 'proposal queries' and datalog rules representing a connection-acceptance query will be referred to as 'acceptance queries'.

Formal definitions for proposal and acceptance queries are presented hereinbelow:

A proposal query associated with a network node n, $q_p(n)$, is a Datalog rule whose head is $F_p(n,X)$, where X is a variable. An acceptance query $q_a(n)$ is a Datalog rule whose head is $F_a(n,X)$. We define another Datalog rule, called the agreement rule, which not associated with any of the nodes. the agreement rule is: $F^+(n,X) \leftarrow F_a(Z,W), F_a(Z,W)$.

$F_a$ and $F_p$ are IDB relation which will contain edges that are candidates to be added to the network. $F^+$ is an IDB relation which will contain the additions to $F^0$, which is an EDB relation. We define another relation, F, as $F=F^+ \cup F^0$. The body of the rules is composed of predicates corresponding to the relation F and the inequality predicate.

In a proposal query, it is required that one of the predicates be of the form F(n, Y), and that X, the variable in the rule head, appear in one of the F body predicates.

In an acceptance query, it is required that one of the predicates be of the form F(Y, n), and that X, the variable in the rule head, appears in one of the F body predicates.

For a query $q_a(n)$ or $q_p(n)$ it is also required that n is the only constant in the query (that is, all the other arguments are variables).

It is a further aim to demonstrate query network evaluation methods, which given a query network (N, $F^0$) as input, construct the resulting fully evaluated query network (N, F).

Query Network Evaluation Methods

One embodiment of a query network evaluation method is an Iterative algorithm presented in FIG. 10. In a query network where only proposal queries are associated with each node, in each iteration, a single evaluation for each of the nodes in the network is performed. If a round is completed without adding any edge to F, the algorithm stops.

Referring back to FIG. 8, an illustration of the query network evaluation using the iterative algorithm is presented through the specific sample. In the first round of evaluation, evaluating the query associated with Lisa yields a result relation with one tuple, (Lisa, Marge). This tuple is added to F, and the stopFlag is toggled to indicate that the main while loop of the algorithm (lines 3 through 12) has to continue for at least another iteration. In this round, the evaluation of the rest of the nodes results in an empty result set. In the second round (respectively, third round), the evaluation of Bart's node (respectively, Lisa's node) resulted in the addition of the edge (Bart, Maggie) (respectively, (Lisa, Maggie)), while the evaluation of the rest of the nodes yields no new tuples. In the fourth round, none of the node evaluations resulted in a non-empty result, and the algorithm stops.

In this example, four rounds of evaluation resulted in 28 single node evaluations. Only three of these evaluations actually yield addition of an edge.

In embodiments of the query-network where nodes are also associated with acceptance queries, a propose-accept evaluation method can be used. In an evaluation round, all proposal queries are evaluated. Acceptance queries are then evaluated only for the proposed nodes. Accepted proposals are then materialized as edges.

Another embodiment of a query network evaluation method is an Iterative algorithm with exhaustive rounds. Instead of evaluating each node once, as stated in line 6 of FIG. 10, each node is exhaustively evaluated. This may result in reducing the number of rounds necessary to fully evaluate a network.

Another embodiment of a query network evaluation method will be referred to as The Backward-Radius Triggering (BRT) evaluation algorithm. Typically, using this algorithm will reach a fully evaluated network by performing a significantly lower number of single node evaluations than when using the iterative algorithm.

BRT takes k, the maximal radius in the network, as input. k is used as a bound on the backward radius of the nodes, and is assumed to be small in relation to the size of the network. In BRT, when an edge, say (u, v), is added, only nodes whose queries can 'sense' the addition are considered for another evaluation. These nodes are such that there exists a (directed) path, whose length is less than the backward radius, between them and the node u.

Pseudo-code for a BRT evaluation algorithm appears in FIG. 11. First, all the nodes are put in the set R, and a single node evaluation is performed for every node n in R. This is in fact a round of network evaluation. For every node n whose evaluation results in the addition of an edge (or multiple edges) to F, the set $$\{m=B(n,l) \cdot \| l < k\}$$

is computed and added to P. P replaces R and the evaluation continues until R is empty.

Referring back to FIG. 8, an illustration of the query network evaluation using the BRT algorithm is presented through the specific sample. In this network, the maximal bradius k=3. If evaluated with the BRT algorithm, the first iteration will consider all the nodes for a single evaluation, and the edge (Lisa, Marge) will be added. B(Lisa, 1)={Bart} and B(Lisa, 2)=∅. Therefore, P={Bart}. The evaluation of the single node in P results in the addition of the edge (Bart, Maggie), and at the end of this iteration, P={Lisa}. In the next iteration, the edge (Bart, Maggie) is added, and P={Bart}. In the next iteration, no edge is added. As a result, P=R=∅ and the algorithm stops.

In this example using the BRT algorithm, the total number of single-node evaluations is (broken by iteration) 7+1+1+1=10. As shown above, the Iterative algorithm performs, on the same network, 28 evaluations. The benefit of saving single rule evaluations comes at the price of computing the sets B(n, k). The Iterative algorithm also does not use k as input.

Yet another embodiment of a query network evaluation method will be referred to as 'Divide and Conquer' (DAC).

The DAC evaluation algorithm takes advantage of the clustered nature of social networks in order to partition query network into networks of more manageable size. Generally speaking, social networks have a structure in which participants have more links to participants within their community than to individuals from other communities. The evaluated sub-networks are later merged together to form the fully-evaluated query network.

Prior art algorithms for graph partitioning are used to partition the graph representing the query network to parts with a relatively small number of edges between them. Partitioning enables processing small, dense sub-networks, as it takes advantage of locality of reference and minimizes work for a merge step. A partitioning algorithm for a query network takes a query network, say (N, $F^0$) as input and produces a number of query networks as output. N is partitioned into (non-overlapping) sets of nodes. Each such set Ni, and the edges in $F^0$ between the nodes in Ni form a query network in the output. Crossing edges are edges in $F^0$ that are in none of the created networks.

DAC takes a graph-partitioning algorithm and the number of parts to partition to as input. In addition, like BRT, DAC takes k, the maximal radius of query in the network, as input. Pseudo code for DAC appears in FIG. 12A. First, the partition algorithm partitions the network into smaller networks. Every part is evaluated separately using the BRT evaluation algorithm (Line 2). Then, a match-making procedure is invoked (Line 4). Two networks such that the number of edges between them is maximal are matched. Then, the rest of the networks are considered, and another pair is matched and so on (see procedure mergePairs). Match making continues until less than two networks remain unmatched.

Each pair is merged into one network (Line 7). The nodes of the new network are the union of the nodes of the networks being merged. The edges are the union of the edges of the networks being merged, as well as the crossing edges between the merged networks. Due to the addition of crossing edges, the merged network is not fully evaluated. The merge&eval procedure evaluates the merged network, first by evaluating all the nodes n that are sources of the cross edges and the nodes within {B(n, l)|l<k} for each such node n, in order to include all the nodes in their backward radius. Like in BRT, any such node whose evaluation results in the addition of new edges triggers the evaluation of the nodes potentially in their backward radius and so on until a fix point is reached.

FIG. 12B illustrates a sample embodiment of a network evaluation procedure using DAC. In the figure, a, c and e represent non-fully-evaluated networks, and b, d and f represent fully evaluated networks.

In (a), a network partitioned into four parts is presented. Crossing edges # between the four parts are presented as well. In b, each of the four parts is fully evaluated, ignoring crossing edges. In (c), the matchmaking result is illustrated. The parts with maximal number of crossing edges between them were merged into pairs. Note that the pairs of networks are not yet evaluated. In (d), the merged and fully evaluated pairs are shown. Another matchmaking step is (e), and the fully evaluated network is (f).

In the BRT and DAC algorithms, k (the maximal radius of query in the network) is given to the algorithm simply by way of simplicity, but need not be known in advance. If the BRT algorithm is used, k can be ascertained before starting the evaluation. If DAC is used, k can be ascertained before evaluating each initial partition before any merge has been done on the first round and maintained for further evaluations as the maximum value of each merged pair. k for different parts may be lower than the global k.

Embodiments of the query network and related embodiments of query network evaluation methods may be applied to other graphic representations of networks, such as but not limited to query networks where not all the nodes have a query associated with them, query networks where some nodes include more than one query, query networks with reciprocal relations (a situation where if 'x' lists 'y', then 'y' also lists 'x'), query networks with non-reciprocal relations, query networks where node queries may include data querying in addition to relational querying, and usage of multiple, local bradius values instead of a single global bradius.

The need further remains for a query language for social networks (SoQL), which will enable participants to query paths and groups of participants which satisfy a set of conditions. SoQL adds new data types called Path and Group to the conventional SQL data types. Each may be an element in a tuple, and include subpaths, subgroups and paths within a group defined in a query. Creation of new data is also based on the path and group structures. Operators which specify conditions on a path or a group are defined. These include aggregation functionalities, as well as existential and universal quantifiers on nodes and edges in a path or a group, and on paths within a defined group.

The following definitions are hereby introduced:

A Social Network—a four-tuple (N, F, $T_N$, $T_F$). N, for nodes, is a set of nodes, each representing a network participant. F, for friends, is a set of undirected edges between distinct elements in N. An edge between nodes u and v represents that u and v list each other in their friends (or connections) list. We use a reciprocal friend model, which means that if participant a lists b as a friend, then b also lists a as a friend. $T_N$ and $T_F$ are relations, as defined below. It will be appreciated that non-reciprocal friend models may be preferred as suits requirements.

Attributes—every node and edge of the network have attributes associated with values. Nodes in the network have similar attributes, the set of attributes associated with the nodes is called the nodes schema. Edges in the network have similar attributes, the set of attributed associated with the edges in called, the edges schema. For example and without limitation, a weight attribute may be included in the edges schema. The values of the attributes are organized in two relations, $T_N$ and $T_F$. The attribute name always exists in the nodes schema, and is a unique key in $T_N$. The attribute id has the same role with respect to $T_F$.

Path—a Path in the network is an ordered set of nodes (i.e., distinct elements in N), such that between every two successive nodes u and v, the undirected edge (u,v) exists in F. The relations P.nodes and P.edges with respect to the path P are the set of nodes and the set of edges appearing in the path P. The tuples in P.nodes are the tuples in $T_N$ corresponding to nodes in P. The tuples in P.edges are the tuples in $T_F$ corresponding to edges in P.

Group—a group in the network is a set of nodes. We define the relation G.nodes with respect to a group G. The tuples in G.nodes are the tuples in $T_N$ corresponding to the nodes in G.

Aggregation Queries over Paths and Groups—a condition on a path or on a group may have the form of an aggregation query over a path or a group. These queries conceptually query the relations Q.nodes and Q.edges where Q is a path or a group. COUNT(P1.nodes.*) is an example for such a query where P1 is a path. It is an abbreviation for the query: COUNT(*) FROM P1.nodes Generally, given an aggregation function $f$ (e.g., max, min, avg, sum, mult) over an attribute 'att' in a relation 'rel' defined with respect to a path or a group Q and given a SQL predicate, then the query:
SELECT f(a) FROM Q.rel WHERE predicate
can be abbreviated as:
f(Q.rel.att WHERE predicate).

It will be appreciated that in contradistinction to traditional aggregation queries on relational data, which aggregate values from typically multiple tuples, aggregation queries over paths and groups aggregate values over one path or one group, i.e., over one element in one tuple.

FIG. 13 illustrates an embodiment of a social network. The network is composed of a graph and two tables. Focus is set on seven participants and on the edges between them. An edge exists between two participants if they are on each other's connections list. For example, Bob # and Charlie # are on each other's connections list. Each node and each edge has a list of attributes. In this example, every node has the attributes name, company, e-mail, position and experience, and each edge has the attributes id and weight.

The values of the nodes and edges attributes are given in Table $T_N$ and $T_E$ respectively in FIG. 13. The id of each edge appears next to it. The weight associated with each edge is a number between 0 and 1. In this example, it is assumed that the weight of an edge (u,v) is the probability that if we ask one of participants u or v to introduce us to the other, they will agree to do that. For example, if we ask Bob to introduce us to Charlie, then the probability that Bob will agree is 0.7.

The SoQL language enables practical utilization of social networks for various needs. Referring back to FIG. 13, it is possible that Bob is looking for a new job. He currently works for ACME, and would like to apply for a position with HAL. He would like to use the connections in his social network in order to find a simple path in the network from him to a manager in HAL. After finding the path using a SELECT FROM PATH query, Bob plans to use a CONNECT USING PATH command in order to ask each of the participants along the retrieved path to introduce him to the next participant, ultimately connecting him to a HAL manager.

Bob would like the path to satisfy a number of requirements:

The person at the end of the path should be a manager in HAL.

The path should consist of at most four participants.

For privacy, the participants along the path, except for the first one, do not work for ACME, Bob's current employer.

As output, Bob would like to have the path as well as the number of participants in the path, ordered by the value of the probability that the participants along the path would introduce Bob one to the other. FIG. 14 is an example of a SoQL query that Bob can use. The intuitive explanation of the query's semantics is as follows:

The path itself and the count of its nodes are selected as output (Line 1). The path itself is composed of two paths, P1 and P2. P1 starts at the node representing Bob and finishes at X, a variable, and P2 starts at X and finishes at Y (Lines 2-3). PATH is the alias of the whole path, in this case, the concatenation of P1 and P2. In Lines 4-5, it is required that a node in the social network substituting Y have a company attribute with the value HAL and a position attribute with the value manager (lines 4 and 5 are node predicates). Lines 6-7 use a path predicate to require that at most zero nodes in P2 be with value ACME for the attribute company. Line 8 we requires that the length, in nodes, of P1 be exactly two (i.e., one edge). Line 9 requires that the length, in nodes, of P2 be four or less. Lines 8-9 use abbreviations for aggregation queries over paths.

Among the paths satisfying these conditions, Bob may want to use paths through which he is likely to succeed in creating a connection to Y. Assuming that the probability that Bob will ask his immediate connection to introduce him to the next person on the path is 1, the probability of connecting to Y through a retrieved path is the multiplication of the weights on the edges of P2. In Line 10, the result is ordered according to this value (descending values).

Assuming that the only participants in the network are the participants whose names are presented in FIG. 13, the set of paths returned by Bob's query is (note that this is not the result of the query):

Path a: (Bob, Charlie, Alice)
Path b: (Bob, Dave, Eve, Alice)
Path c: (Bob, Dave, Gloria, Alice)

Note that the path (Bob, Dave, Eve, Frank, Gloria, Alice) is not returned by the query since its number of nodes is six, whereas paths satisfying the query illustrated in FIG. 11 may have four nodes at most.

The query also retrieves the number of nodes in each retrieved path, and the results are to be ordered (descending) by the multiplication of the weights of the edges of P2. The latter value is 0.3 for Path a above, 0.16 for Path b and 0.765 for Path c. Therefore, the result of the query is the following binary relation:

(Path c,4)
(Path a,3)
(Path b,4)

The extensions that SoQL introduces to SQL will be introduced herein. These extensions including two types of SoQL commands: SELECT queries, which retrieve data, and CONNECT commands which use a path or a group in a process during which new data in the network may be created.

SELECT Queries

A SELECT FROM PATH query returns a relation in which elements of a tuple are either a path or an aggregation over a path. The formal definitions and related examples listed hereinbelow relate to the syntax outline illustrated in FIG. 15.

Path—The FROM PATH clause defines the query path. The path is composed of subpaths. <name> is a value of the attribute name of the first node in the path. Then, TO <var> AS <alias> indicates the name of the variable representing the last node in first subpath, and the alias, i.e., the unique name through which the subpath can be referred. Any successive TO <var> AS <alias> defines another subpath, starting at the last node of the previous subpath and ending at a node represented by <var>. The query path is the concatenation of the subpaths (in the order in which they appear in the query). PATH is always the alias of the query path.

In FIG. 15, lines 2-3 define P1 and P2 which are subpaths of the query path. P1 starts at the node representing Bob and ends at X. P2 starts at X and ends at Y. Together, they form the query path.

Fields—Each field is either a path, an alias of a subpath or an aggregation function over the query path or a subpath.

In FIG. 15, Line 1 has two fields. The first is an aggregation function over the query path and the second is the query path itself.

Node Predicates—A node predicate specifies a condition on an attribute of a node, and evaluates to either true or false given a node in the network. The attribute is referred to through a variable (e.g., X.company), a constant (e.g., Bob.position) or within a path predicate, to be defined later on.

In FIG. 15, the predicate in Line 5 in the query syntax sample is a node predicate.

Edge Predicates—An edge predicate specifies a condition on an attribute of an edge, and evaluates to either true or false given an edge in the network. The attribute is referred to through a variable, which always represents a node in the query path. If X is a variable, the edge preceding the node represented by X in the query path is referred to by X.pre-edge. The following edge is referred to by X.fol-edge. Example. The following edge predicate evaluates to true if the edge following X in the query path has attribute att with value val. X.fol-edge.att='val'

Path Predicates—A path predicate specifies a condition on the query path or on a subpath, and evaluates to either true or false given a path in the network. A path predicate has the following structure: <path-predicate>:=<agg-path-predicate>|<path-operator> IN <path-alias>.nodes SATISFY(<node-predicates>) |<path-operator> IN <path-alias>.edges SATISFY (<edge-predicates>)<node-predicates>:=<node-predicate>|<node-predicate> OR <node-predicate>|<node-predicate> AND <node-predicate>|NOT <node-predicate> <edge-predicates>: =Boolean combinations with <edge-predicate>

Aggregation Path Predicates—A path predicate can be of an aggregation path predicate type (element <agg-pathpredicate> above), which is an aggregation query over a path whose result is equated or compared to a constant or to another aggregation path or group query. Referring back to FIG. 14, the predicate in Line 8 in the query evaluates to true if the number of nodes in P2 is 2. The following aggregation path predicate evaluates to true if and only if the number of nodes in P1 is less than the number of the edges in P2 whose value for the attribute att is val.

COUNT(P1.nodes.*)>=COUNT(P2.edges.*WHERE att='val')

Path Operators. A path operator (element <pathoperator> above) specifies a condition on the nodes or the edges in a path. If .nodes follows the path alias (element <path-alias> above), then the condition is on the nodes, expressed via a Boolean combination of node predicates. If .edges follows, the condition is on the edges, expressed via a Boolean combination of edge predicates.

The path operators that can be used are:
  ALL. The path predicate using this operator evaluates to true if the predicate following SATISFY evaluates to true on every node/edge in the path referred to by the alias.
  ATMOST n. The path predicate using this operator evaluates to true if the predicate following SATISFY evaluates to true on at most n nodes/edges. The operator NOT is a shorthand for ATMOST 0.
  ATLEAST n. The path predicate using this operator evaluates to true if the predicate following SATISFY evaluates to true on at least n nodes/edges.
  ALL EXCEPT UPTO n. The path predicate using this operator evaluates to true if the predicate following SATISFY evaluates to true on all the nodes/edges, except for up to n.
  MAJORITY. The path predicate using this operator evaluates to true if the predicate following SATISFY evaluates to true on more than half of the nodes/edges in the path.

Referring back to FIG. 14, Lines 6-7 contain a path predicate. The path operator is ATMOST 0, the path alias is P2 and the node predicate is specified with the attribute company in the nodes schema.

Order By. As in SQL, the output is sorted according to the ordered list of fields following ORDER BY. Ordering by a path or a group is done according to the lexicographic order of the string representation of that object. The string representation of a path (respectively, a group) is illustrated in the example in FIG. 14. Numeric values are descending.

A SELECT FROM GROUP query returns a relation in which elements of a tuple are either a group element, a path element between members of the group or an aggregation over a group or path. The syntax of a SELECT FROM GROUP query is illustrated in FIG. 16. Elements with the same name as in SELECT FROM PATH have the same definition.

FIG. 17A illustrates a sample SELECT FROM GROUP query that Bob will use to look for people who meet the following conditions:
  The group consists of Bob and exactly three other distinct network members.
  There exists a path with up to three edges from Bob to each of the three other members of the group.
  There exists a path with up to two edges between every two of the three members of the group who are not Bob.
  Each of the three members who are not Bob has experience value of at least 5.

FIG. 17B shows the result of such query.

The number of members in the retrieved group is predetermined to be four (including Bob). However, SoQL allows retrieving groups whose number of members is not predetermined.

Referring back to the sample in FIG. 17A, suppose Bob is now interested in groups of either four or five members. However, if the retrieved group is of five members, then only three out of the four who are not Bob are required to have a path of up to three edges between them and Bob. The other two conditions still have to hold for all the members of the group who are not Bob, regardless of their number being four or five. That is, all have to have experience value of at least five, and a path of up to two edges exists between every two members who are not Bob. In order to retrieve such groups, referring back to FIG. 17a, Lines 2 through 3 should be changed to:
  FROM GROUP(Bob AS G1,
  DISTINCT(X,Y,Z) IN G2)

And the following predicate to the WHERE clause starting in line 7 should be added in order to ensure that the total number of members in G2 is no more than four:
  and COUNT(GROUP.nodes.*)<=5,
  or equivalently:
  and COUNT(G2.nodes.*)<=4.

The formal definitions listed hereinbelow relate to the syntax outline illustrated in FIG. 16, and the examples for each definition relate to FIG. 17A.

The Group—The FROM GROUP clause defines the query group which is a union of subgroups. Each subgroup has an alias and a list of distinct variable names and node names (element <nov> above). A subgroup G can either consist of exactly the members of the list (using the syntax AS G), or just contain them (using the syntax IN G). The participant issuing the query must be in the query group (i.e., appear as a constant name in one of the subgroups). Note that the number of members in a subgroup is not necessarily fixed in advance. Subgroup members within the DISTINCT operator represent distinct network participants.

Lines 2-3 in the query listed in FIG. 14A define Bob as a subgroup with alias G1 and X,Y and Z as all the distinct members of another subgroup with alias G2. In query (2), X,Y and Z are distinct members of G2, a group containing them.

Paths—The WITH PATH clause gives aliases to paths between members of the query group, to be referred in other parts of the query.

Referring back to FIG. 17*a*, Line 7 (respectively, 8, 9) has a path predicate corresponding to a path aliased in Line 4 (respectively, 5, 6). Path predicates have the same semantics as in SELECT FROM PATH queries.

Fields—a field is either a GROUP, an alias of a subgroup or path or an aggregation function over a path, the query group or a subgroup.

Group Predicates—a group predicate specifies a condition on the query group or a subgroup, and may refer to paths involving their members. A group predicate evaluates to either true or false given a group in the network. A group predicate structure is illustrated in FIG. 18.

Aggregation Group Predicates—similarly to aggregation path predicates in SELECT FROM PATH queries, an aggregation group predicate (element <agg-group-predicate> above) operates over the relation G.nodes defined with respect to a group or subgroup G, equated or compared to a constant or to another path or group aggregation query.

Group Operators—a group operator (element <groupoperator> above) over a group G refers either to nodes in G or to paths involving members of G. If the operator is followed by IN G.nodes, then it refers to the group nodes. If the operator is followed by SUBGROUPS it refers to paths defined using the variables in SUBGROUPS. In a satisfying substitution, variables in SUBGROUPS can only be substituted by distinct nodes.

When the operator refers to group nodes, the operators are the same operators we use for paths (i.e., ALL, ATMOST n, ATLEAST n, ALL EXCEPT UPTO n, MAJORITY). The node predicate which follows SATISFY in this case evaluates to true or false as defined for path operators.

If the group operator refers to paths rather than nodes (i.e., followed by SUBGROUPS), then in the following SATISFY, paths are defined using the variables in SUBGROUPS and a path predicate is used for each path (element <p-a-predicate> above).

When group operators refer to paths, their semantics are as follows:

ALL SUBGROUPS—the group predicate using this operator evaluates to true if the Boolean combination of aliased path predicates (element <p-a-predicates> above) in SATISFY evaluates to true for every subgroup, i.e., for every substitution of distinct nodes for the variables following SUBGROUPS.

ATLEAST n SUBGROUPS—the group predicate using this operator evaluates to true if there exist n distinct subgroups which satisfy the predicate in SATISFY.

ALL EXCEPT UPTO n SUBGROUPS—the group predicate using this operator evaluates to true if all subgroups, except for up to n, satisfy the predicate in SATISFY.

MAJORITY SUBGROUPS—the group predicate using this operator evaluates to true if more than half of the subgroups satisfy the predicate in SATISFY.

Referring back to FIG. 17*a*, In Lines 10-11 of the first query in this section, the group operator ALL is used over the nodes of G2. In Lines 12-14, the group predicate uses the operator ALL SUBGROUPS(U,V) over G2. The path predicate evaluates to true on a path whose number of edges is at most 2. Note that the path is aliased as P4.

CONNECT Commands

Connect Using Path

The CONNECT USING PATH command specifies how to use paths in a one-column relation of paths in order to attempt to create a connection to the participant(s) at the end of the paths. The command can automate the process of asking each member of the path, say v, to introduce the first member of the path to the successor of v in the path, and so on, until the first member is introduced to the last member. Typically, a network participant p can only use paths in which p is the first member.

Referring back to FIG. 13, it is possible, for example and without limitation, that after retrieving paths that connect Bob to Alice, Bob would like to use the result in order to attempt to create a connection between himself and Alice. The attempt will be carried out by asking each network participant along the path to Alice to introduce Bob to the next participant.

If R is the projection of the result of query in FIG. 14 on the first column (with type Path), the query that Bob will use is listed herein.

```
₁CONNECT USING PATH
₂FROM R
₃WHERE TIMEOUT=36, ATTEMPTS=5,
₄PARALLEL=2, HISTORY=true
```

In this example, the process that will be initiated is the following:

A message from Bob to Charlie will be sent, asking Charlie to introduce Bob to Alice (first path). In parallel, a message from Bob to Dave will be sent, asking Dave to introduce Bob to Eve (second path). These are the beginnings of two attempts. The two can be performed in parallel since the query specifies PARALLEL=2.

If Charlie or Dave refuse to make the connection, the corresponding attempt fails. If either or both agree, a message introducing Bob to the next member of the path is sent. At this point the attempt may fail again and so on. Since HISTORY=true, each introduction includes the prefix of path used up to this introduction. Eventually, Bob is introduced to Alice as a participant requesting to be connected to her. If Alice agrees, a connection between her and Bob is added, the attempt succeeds, and the command terminates.

In this sample, the total number of attempts allowed is five since ATTEMPTS=5. If both attempts fail, there are three more attempts allowed. Therefore, another two can be started, in parallel. In our case, R contains one more path. An attempt based on that path is carried out.

In this sample, if 36 hours pass, the command terminates and all attempts fail.

The paths using which the connection attempts will be done are given after FROM, as a one-column relation. The column is of type Path (the relation can be given explicitly or as a SELECT FROM PATH query). Being a relation, its tuples are ordered. The attempts to create the connections will be done using the paths in this order. After the first success, the command terminates (and other attempts stop). If the number of hours specified for TIMEOUT pass without a success, the command and all its attempts stop. The value for PARALLEL specifies how many paths can be explored in parallel. When the factor is 1, the result is sequential attempts, i.e., one path is explored at a time until failure or success. The operation is such that given a PARALLEL value of n, then only when, and if, all n attempts fail, another set of n is explored in parallel. The attempts continue until all input paths are exhausted or until the maximum number of attempts is reached.

Connect Using Group

The CONNECT GROUP command specifies how to use groups from an input relation in order to attempt to create connections between all member pairs in the group. Similarly to CONNECT USING PATH, the command uses a one-column relation with a group element in each tuple. The command will address each of the group's prospective members with a proposal from the participant who issued the command to form a group with the rest of the group members. If all agree, the attempt succeeds and the group is formed, i.e., each member lists the other members as their connections in the network.

As in CONNECT USING PATH, some parameters for CONNECT GROUP can be set. Timeout, number of attempts and parallelism factor have a meaning identical to the meaning in CONNECT USING PATH.

For example and without limitation, referring back to FIG. 17A, if R is the projection of the result of the query, the following query:

```
₁CONNECT GROUP
₂FROM R
₃WHERE TIMEOUT=48, ATTEMPTS=3,
₄PARALLEL=1
```

The command will try one group at a time, starting with {Bob, Eve, Frank, Gloria}. If an attempt fails, another attempt will be made with next group, up to three attempts. The timeout is two days.

With regard to the deployment and implementation of a SoQL engine, evaluation approaches are hereby introduced.

SoQL is built to allow formulating conditions over groups or paths whose size or length is not fixed, which may result in very large results, for example and without limitation formulating queries without setting a bound on the size of a GROUP. A practical approach for evaluating such queries include deployment parameters aiming to ensure the feasibility of evaluating SoQL queries, such as but not limited to the maximum number of tuples in the result, the maximal length of any path considered in the query, the maximal size of any group, and the maximal time to be spent on a single query evaluation.

With regard to finding Paths using Joins—computing query paths for centralized data can be performed with techniques used in relational databases. Paths starting at the node given as a constant in the query can be found by performing self-joins over F. Before every join, intermediary results with no potential to form a path are pruned. Top-k evaluations (based on relevant scoring functions) for this joins are also useful for avoidance of large intermediate results for these joins. The number of joins can be bounded by a deployment parameter, and may be affected by the other parameters as well.

Finding Groups. One method of evaluating SELECT FROM GROUP queries is to decompose, as much as possible, the group definition to several path definitions and evaluate the corresponding path queries. For example, since the query group always contains the participant issuing the query, paths from that participant to other participants can be found first and evaluated (using the techniques above or others). Then, other paths are processed. The results are joined based on variables that appear in more than one path. Note that complex considerations are required in this type of queries, such as the maximum number of group members and its effect on satisfying the group predicates used. Members in the query group not defined as a part of a path can be found using ordinary relational queries. The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A system which uses a query-network to represent social connections in a social network comprising:
    a database apparatus of an online social network which is connected to a network and comprises:
    an interface; and
    a memory storing code; and
    a processor coupled to the interface and the memory which executes the code, the code comprising:
    code instructions for updating a plurality of nodes of a query-network representation of a plurality of social connections between a plurality of participants of a social network by performing the following for each one of said plurality of participants:
    code instructions for using said interface for communicating with a respective said participant over said network to acquire a policy for establishing social connections between said respective participant and other participants of said plurality of participants;
    code instructions for specifying an edge-defining query and an edge-accepting rule according to said policy;
    code instructions for associating said edge-defining query and said edge-accepting rule with one of a plurality of nodes in said query-network representation;
    code instructions for defining said plurality of social connections by automatically and recursively adding or subtracting a plurality of edges each connecting between a pair of said plurality of nodes until said edge-defining query and said edge-accepting rule of said plurality of nodes are complied with;

wherein each one of said plurality of edges represents a social connection that is complied with a respective said edge-accepting rule of one of said plurality of nodes and a respective said edge-defining query of another of said plurality of nodes.

2. The system of claim 1, wherein said edge-defining query defines a set of generated-edges to be added to said query-network representation.

3. The system of claim 2, wherein said set of generated-edges connects the node associated with said edge-defining query with another node selected from said plurality of nodes.

4. The system of claim 2, wherein said query-network representation further comprises a plurality of additional nodes specifying at least one of an additional edge-defining query and an additional edge-accepting rule.

5. The system of claim 4, wherein said edge-accepting rule defines a subset of generated-edges to be actually added to said set of edges.

6. The system of claim 1 wherein said edge-accepting rule comprises a datalog rule.

7. The system of claim 1 comprising a plurality of storage units, each containing a portion of said plurality of nodes and edges, connected to form said query-network representation.

8. The system of claim 1 wherein said plurality of nodes contains data pertaining to at least one of a group consisting of: a social network, a professional network, an academic network, and an item network.

9. The system of claim 1, wherein said plurality of edges includes a set of directed edges.

10. The system of claim 1, wherein said plurality of edges includes a set of undirected edges.

11. The system of claim 1, wherein said plurality of edges comprises automatically and recursively subtracting edges.

12. The system of claim 1, wherein each said node is associated with a distinct edge-defining query that is defined according to a distinct policy from a plurality of policies.

13. A method of managing a query-network representing social connections in a social network using a processor, comprising:
using a database apparatus of an online social network which is connected to a network and having at least one hardware processor for updating a plurality of nodes of a query-network representation of a plurality of social connections between a plurality of participants of a social network by performing the following for each one of said plurality of participants:
using an interface of the database apparatus for communicating with a respective said participant over the network to acquire a policy for establishing social connections between said respective participant and other participants of said plurality of participants;
using said at least one hardware processor for specifying an edge-defining query and an edge-accepting rule according to said policy;
using said at least one hardware processor associating said edge-defining query and said edge-accepting rule with one of a plurality of nodes in said query-network representation;
using said at least one hardware processor for defining said plurality of social connections by automatically and recursively adding or subtracting a plurality of edges each connecting between a pair of said plurality of nodes until said edge-defining query and said edge-accepting rule of said plurality of nodes are complied with;
wherein each one of said plurality of edges represents a social connection that is complied with a respective said edge-acceptance rule of one of said plurality of nodes and a respective said edge-defining query of another of said plurality of nodes.

14. The method of claim 13, wherein said recursively adding or subtracting comprises:
selecting a node from said plurality of nodes;
evaluating the selected node according to the edge-defining query associated therewith;
selecting another node from said plurality of nodes and repeating said evaluating; and
terminating said recursively adding or subtracting when all members of said plurality of nodes have been evaluated.

15. The method of claim 14 wherein said evaluating, comprising:
adding to said plurality of edges the members of a set of generated-edges defined by at least one edge-defining query associated with said selected node;
repeating said adding when said set of generated-edges is not an empty set; and
selecting said another node from said nodes and repeating said evaluating when said set of generated-edges is an empty set.

16. The method of claim 14 wherein said selecting comprises:
generating a subset of nodes which are connected to the previously selected node via a path containing less edges than the radius of the query-network representation; and
selecting a member of said subset.

17. The method of claim 14, wherein said plurality of nodes are evaluated according to an edge-defining query associated with a selected node.

18. The method of claim 14, wherein said plurality of edges are used in an evaluation of an edge-defining query associated with a selected node.

19. The method of claim 13, further comprising:
partitioning said social network into a plurality of sub-networks;
fully evaluating each said sub-network such that all edges defined by said edge-defining query become members of said set of edges; and
merging said evaluated sub-networks.

20. The method of claim 19, wherein said merging is performed according to a Backward-Radius Triggering (BRT) evaluation algorithm.

* * * * *